US012747041B2

(12) United States Patent
Worden et al.

(10) Patent No.: US 12,747,041 B2
(45) Date of Patent: Sep. 29, 2026

(54) SPACE VEHICLE INTRUSION DETECTION SYSTEM (IDS)

(71) Applicant: Raytheon Company, Arlington, VA (US)

(72) Inventors: Michael J. Worden, Aurora, CO (US); Steven J. Austin, Sr., Aubrey, TX (US); Damian P. Mcloughlin, Aurora, CO (US)

(73) Assignee: Raytheon Company, Arlington, VA (US)

( * ) Notice: Subject to any disclaimer, the term of this patent is extended or adjusted under 35 U.S.C. 154(b) by 79 days.

(21) Appl. No.: 18/899,588

(22) Filed: Sep. 27, 2024

(65) Prior Publication Data

US 2026/0091889 A1 Apr. 2, 2026

(51) Int. Cl.
*B64G 3/00* (2006.01)

(52) U.S. Cl.
CPC .................................... *B64G 3/00* (2013.01)

(58) Field of Classification Search
CPC ........................................................ B64G 3/00
USPC ........................................................ 244/158.1
See application file for complete search history.

(56) References Cited

U.S. PATENT DOCUMENTS

| | | | | |
|---|---|---|---|---|
| 9,591,005 | B2 | 3/2017 | Buehler et al. | |
| 10,497,231 | B2 | 12/2019 | Mullins | |
| 2022/0371755 | A1* | 11/2022 | Mukae | B64G 1/1085 |
| 2023/0382567 | A1* | 11/2023 | Mozumdar | H04L 9/0891 |
| 2025/0315748 | A1* | 10/2025 | Thorpe | B64G 1/1085 |

FOREIGN PATENT DOCUMENTS

| | | | | |
|---|---|---|---|---|
| CN | 112124640 A * | 12/2020 | B64G 3/00 |
| KR | 100351306 B1 | 9/2002 | |
| WO | WO-2021065734 A1 * | 4/2021 | G08B 21/18 |

* cited by examiner

*Primary Examiner* — Christopher P Ellis
(74) *Attorney, Agent, or Firm* — Schwegman Lundberg & Woessner, P.A.

(57) ABSTRACT

Systems, devices, methods, and computer-readable media for space vehicle security are provided. A space vehicle can include a navigational controller configured to determine a mode of the space vehicle, a power supply configured to provide power to components of the space vehicle, a transceiver configured to determine whether a communications channel to a ground station is open, and an intrusion detection monitor configured to monitor for non-nominal outputs from components of the space vehicle, the components that are monitored are variable based on a power level of the power supply, a connectivity state of the transceiver, and the mode.

20 Claims, 5 Drawing Sheets

SPACE VEHICLE INTRUSION DETECTION SYSTEM (IDS)

TECHNICAL FIELD

Aspects regard intrusion detection systems (IDSs) that can operate reliably on space vehicles. The IDSs flexibly apply varying levels of intrusion detection based on a state of the space vehicle and the commanded mode of the space vehicle.

BACKGROUND

Space vehicles, such as satellites, cargo space vehicles, crewed spacecraft, or the like, typically have limited memory and processing bandwidth. Space vehicles have intermittent communications capabilities and must prioritize conservation of power. The memory and processing bandwidth of the space vehicles is quickly consumed by necessary operations. There is little processing and memory capacity left over for performing intrusion detection. It would be beneficial to have an intrusion detection system (IDS) that operates to provide intrusion detection while consuming little processing and memory capacity in the process.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Processing and memory capacity of a space vehicle are consumed in both detection of an anomalous sensor reading and reporting of the anomalous sensor reading. The amount of processing and memory capacity consumed depends on the complexity of an intrusion detection system (IDS) that detects the anomalous sensor reading. The more complex and hardware intensive the IDS, the more power that is consumed by the IDS. The more data that is reported by the IDS, the more power that is consumed by the IDS. Space threats are evolving fast, now including intrusion vectors from other space vehicles, and it can be more flexible and robust to identify intrusions from a device with more processing and memory capacity than the space vehicle. It would also be useful to have and IDS that provides suitable protection dependent on space vehicle commanded state and also based on resources including power and connection state.

Figure 1:
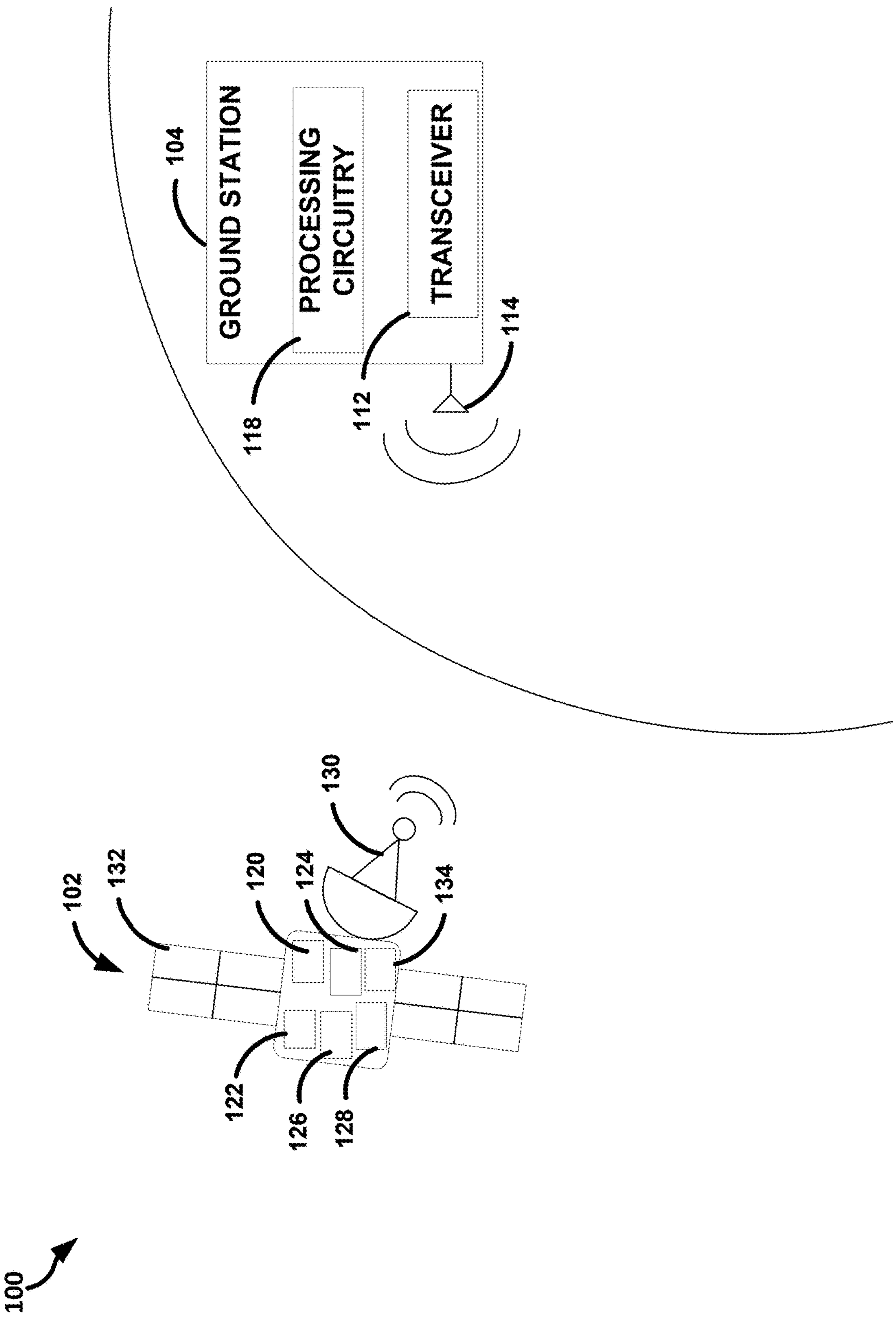
FIG. 1 illustrates, by way of example, a diagram of an embodiment of a system for space vehicle intrusion detection.

FIG. 1 illustrates, by way of example, a diagram of an embodiment of a system 100 for space vehicle intrusion detection. The system 100 as illustrated includes a space vehicle 102 (illustrated in the form of a satellite) and a ground station 104. The space vehicle 102 as illustrated includes an antenna 130, power supply 132, navigation control 120, transceiver 122, a positioning system 124, an inertial navigator 126, an intrusion detection data monitor 134, and a cryptography circuit 128.

The space vehicle 102, in the form of a satellite, can include a communication, remote sensing (e.g., weather, electromagnetic sensing, radar, lidar, or the like), navigation (e.g., global positioning system (GPS), Galileo, or the like), internet, radio, television, manned, unmanned, or other satellite. The space vehicle 102 is generally any device capable of communication with the ground station 104. The space vehicle 102 can be orbiting the Earth, whether in low Earth orbit (LEO), medium Earth orbit (MEO), geosynchronous Earth orbit (GEO) or high Earth orbit (HEO) or could be a naturally occurring celestial body external to the Earth.

The power supply 132 can include one or more batteries, nuclear, power, solar panels, or a combination thereof. The state of the power supply 132 indicates how much power is available to the space vehicle 102. The power available indicates whether the space vehicle 102 has sufficient power to run IDS operations, such as monitoring and communicating data that relevant to determining whether there is an intrusion.

A navigation control 120 is a processing unit. The navigation control 120 sets the operating mode of the space vehicle 102 based on inputs from the power supply, the positioning system 124, the navigator 126, other sensors, or the like.

The transceiver 122 is controlled by the navigation control 120. The transceiver 122 communicates, by wireless communication signals, data to and receives data from the ground station 104. The transceiver 122 provides payloads that can be monitored for cyber attacks.

The positioning system 124 can include a GPS system, Galileo, or the like. The positioning system 124 can be spoofed and can be monitored for such spoofing.

The inertial navigator 126 provides additional location and navigation support along with the positioning system 124. The inertial navigator uses motion sensors (accelerometers), rotation sensors (gyroscopes) and a computer to continuously calculate by dead reckoning the position, the orientation, and the velocity (direction and speed of movement) of a moving object without the need for external references.

The cryptography circuit 128 encrypts communications to the ground station 104 and decrypts communications from the ground station 104. The cryptography circuit 128 is susceptible to attack and can be monitored for intrusion.

The intrusion detection data monitor 134 monitors the components of the space vehicle 102 for data that potentially indicates there is an intrusion at the space vehicle 102. The data that potentially indicates there is an intrusion is data that is outside of nominal ranges. The nominal ranges of a given sensor can be defined by a subject matter expert (SME). The intrusion detection data monitor 134 can, when it detects data that is not in the defined nominal ranges and the space vehicle 102 is in one of a number of specified operational states, record the data. The recorded data can be recorded with a timestamp, an identifier that uniquely identifies the component that generated the data, or the like. The recorded data can be communicated to the ground station 104 when the satellite is in communication range, has sufficient power, and is in one of a number of specified operational states.

The space vehicle 102 as illustrated includes sensor(s), transceiver 122, and an antenna 130. The transceiver 122 is a receive and transmit radio. The transceiver 122 receives electrical signals transduced by the antenna 130. The transceiver 122 can demodulate data from such signals. The transceiver 122 can modulate data onto electrical signals. The antenna 130 can convert the modulated electrical signals to an electromagnetic wave that is transmitted to the monitor 106. The data modulated onto the wave can include Keplerian element data or equivalent navigational content, as determined by the sensor(s), a time as provided by a clock, data relevant for IDS operation, or a combination thereof. The clock of the space vehicle 102 is often an atomic clock with a very high time accuracy (e.g., with a maximum drift of about 2 nanoseconds a year). The sensor (s) can include electro optical sensor(s) (e.g., visible, infrared (IR), or other electromagnetic radiation frequency sensor), three-axis accelerometer, gyroscope, temperature, weather, laser altimeter, lidar, radar, ranging instrument, scatterometer, sounder, radiometer, spectrometer, spectroradiometer, or the like.

The ground station 104 as illustrated include a transceiver 112, processing circuitry 118, and an antenna 114. The transceiver 112 modulates data to be provided to the space vehicle 102 and receive electrical signals from the space vehicle 102. The processing circuitry 118 performs operations on the received data (and other data) to determine whether the space vehicle 102 has or has had an intrusion. The processing circuitry 118 can include electrical components configured to perform the operations on the received data. The processing circuitry 118 can include one or more resistors, transistors, capacitors, diodes, inductors, logic gates (e.g., AND, OR, XOR, negate, buffer, or the like), regulators (e.g., voltage, current, or power), amplifiers, power supplies, analog to digital converters, digital to analog converters, multiplexers, switches, buck or boost converters, or the like. The processing circuitry 118 can include a processing unit, such as can include one or more central processing units (CPUs), graphics processing units (GPUs), field programmable gate arrays (FPGAs), application specific integrated circuits (ASICs), or the like. Two or more of the processing units can operate in different number systems, such as in parallel.

The ground station 104 acts as a data processing center for information collected by the monitor. Orbit coordinates can be determined by trilateration and the orbit model (ephemeris). When the satellite drifts out of expected orbit, repositioning can be undertaken. The clock may also be readjusted, but more usually information on time errors is attached to signals as correction factors. The computed corrections, time readjustments and repositioning information can be transmitted to the satellite via an uplink from the monitor 106.

The following table summarizes an example of an IDS technique that can be employed by the space vehicle 102.

TABLE 1

Summary of example IDS technique

| SPACE VEHICLE MODE | SPACE VEHICLE STATE: AVAILABLE POWER | SPACE VEHICLE STATE: CONNECTIVITY | SPACE VEHICLE STATE: SPACE VEHICLE FUNCTIONALITY | IDS PROTECTIONS |
|---|---|---|---|---|
| LAUNCH & EARLY ORBIT | HIGH | CONNECTED | ALL MISSION FUNCTIONS | REAL-TIME ALERTS, HOST MONITOR, CONNECTION MONITOR |
| NOMINAL OPERATIONS | HIGH | CONNECTED | ALL MISSION FUNCTIONS | REAL-TIME ALERTS, HOST MONITOR, CONNECTION MONITOR |
| NOMINAL OPERATIONS | HIGH | DISCONNECTED | ALL MISSION FUNCTIONS | STORE ALERTS, HOST MONITOR, CONNECTION MONITOR |
| SAFE | MINIMAL | DISCONNECTED | ESSENTIAL FUNCTIONS | MISSION-SPECIFIC MONITOR, STORE ALERTS |
| SURVIVAL | UNCERTAIN | DISCONNECTED | ESSENTIAL FUNCTIONS | MISSION-SPECIFIC MONITOR, STORE ALERTS |

Figure 2:
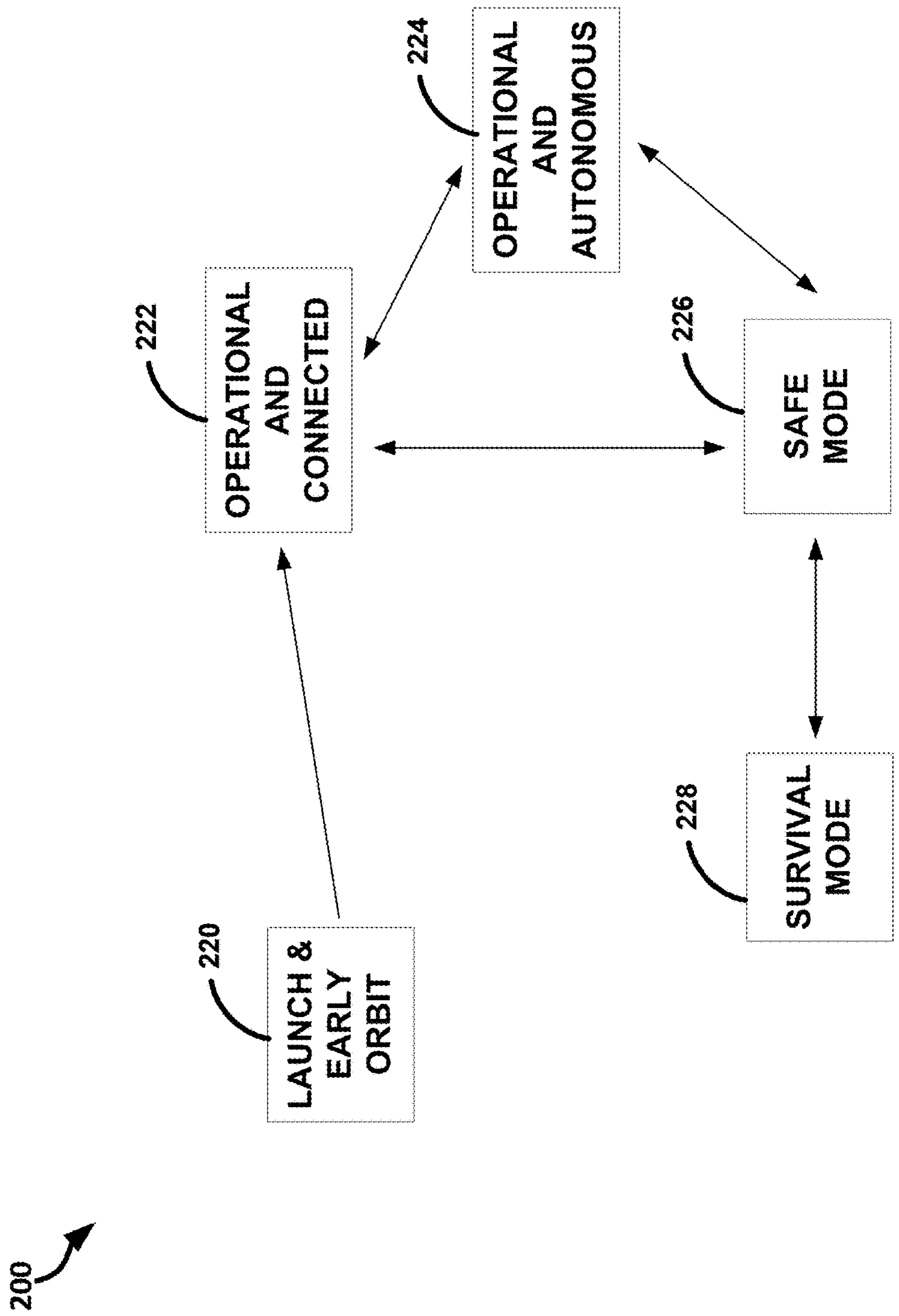
FIG. 2 illustrates, by way of example, a simple flow diagram of space vehicle states.

FIG. 2 illustrates, by way of example, a simple flow diagram of space vehicle states 200. The states, as illustrated in FIG. 2, are the modes and corresponding relevant connectivity from Table 1. The states includes launch and early orbit 220, operational and connected 222, operations and autonomous (disconnected) 224, safe mode 226, and survival mode 228.

In launch and early orbit 220, the space vehicle 102 is at more risk than in orbit. This is because an attacker has easier access to the space vehicle 102 as the space vehicle 102 is still terrestrial at points in the launch and early orbit. The power and communications available during launch allow the IDS monitor 134 to provide real-time alerts to the ground station 104 when data is not nominal. The power and communications available also allow the IDS monitor 134 to monitor all operations of the space vehicle 102 that can indicate whether or not there is an intrusion.

In the operational and connected state 222 the IDS monitor 134 can perform the same operations as it does in the launch and early orbit state 220. Since sufficient power is available and the space vehicle 102 has communications capability with the ground station 104 in this state, the monitor 134 can cause relevant, non-nominal data to be provided to the ground station 104.

In the operational and autonomous state 224 the space vehicle 102 is operating as usual but does not currently have a communications channel to the ground station 104. Instead of relaying non-nominal data to the ground station 104 in real time, the space vehicle 102 can store the data in on-satellite memory (see memory 334 of FIG. 3). Then, after communications with the ground station 104 are re-established, the space vehicle 102 can send the non-nominal data to the ground station 104.

In the safe mode 226 power from the power supply is lower than what is required to operate all functions of the space vehicle 102 for the mission. In the safe mode 226, the mission operations are prioritized over IDS operations. Instead of monitoring all of components that are monitored in modes in which there is sufficient power, in safe mode 226 only components that are being used in a given mission are monitored. Any non-nominal data that is detected can be stored, like in the operational and autonomous state 224. The stored data can then be sent to the ground station 104 when power and connectivity are sufficient for such operations.

In survival mode 228 the IDS monitor 134 can be turned off. In survival mode 228, the space vehicle 102 is trying to ensure that it stays in orbit and operational, at least in a minimal capacity to be useful. The survival mode 228 is intended to help the space vehicle 102 survive a malfunction, attack, or other adverse event that significantly harms the ability of the space vehicle 102 to operate to perform the mission.

Figure 3:
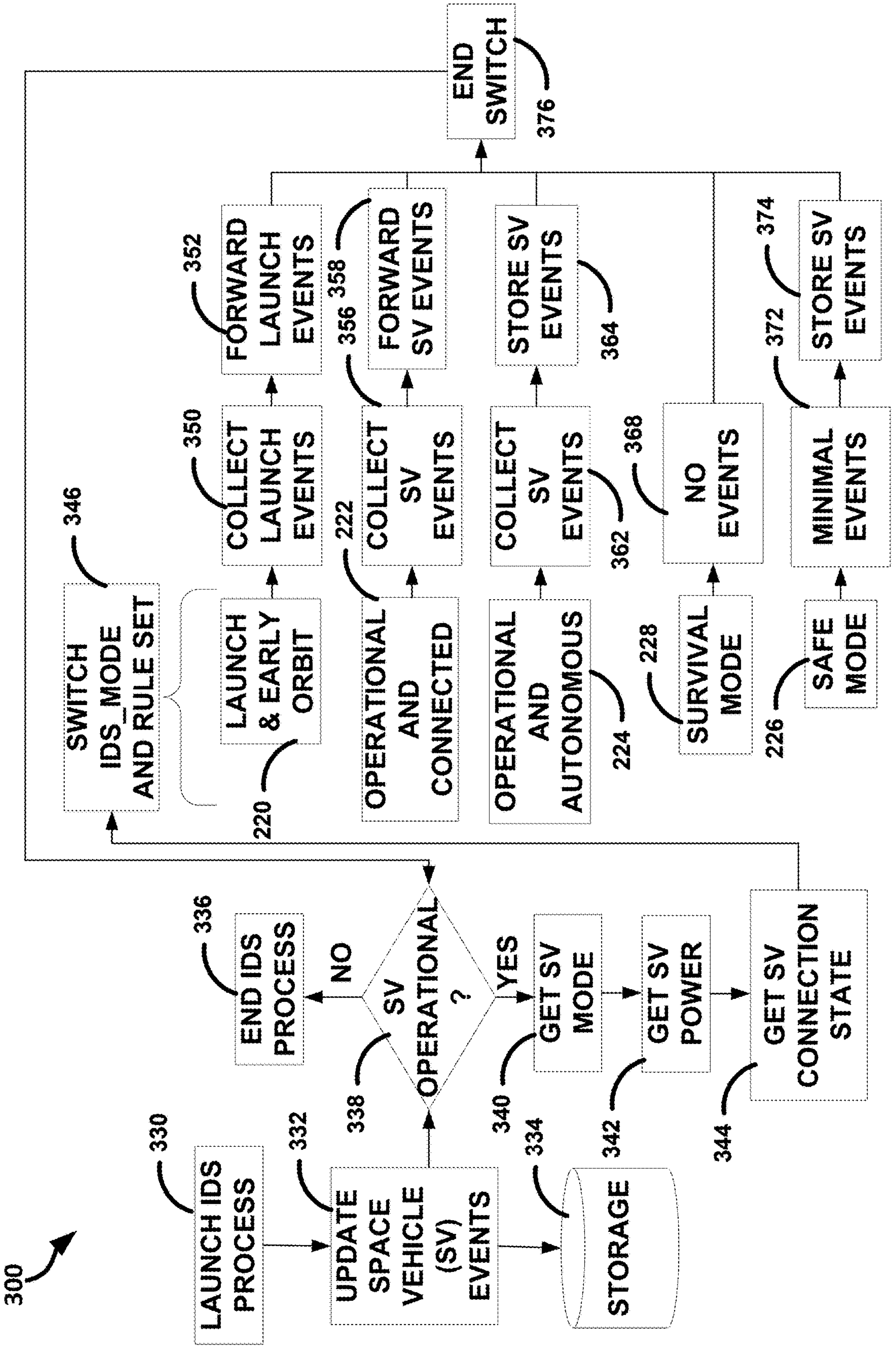
FIG. 3 illustrates, by way of example, a diagram of an embodiment of a flow diagram of operations that can be performed by an IDS monitor.

FIG. 3 illustrates, by way of example, a diagram of an embodiment of a flow diagram of operations 300 that can be performed by the IDS monitor 134. The operations 300 include launching an IDS process at operation 330. Launching the IDS process includes instantiating and executing the IDS monitor 134. The IDS monitor 134 can then start receiving data from components that are being monitored for an intrusion.

At operation 332, the IDS monitor 134 updates space vehicle 102 events (if applicable). The events correspond to data that is out of nominal range. The operation 332 can include storing the data at the memory 334 or communicating the data to the ground station 104.

At operation 338, the IDS monitor 134 can determine whether the space vehicle 102 is operational. If the space vehicle 102 is not operational or is in survival mode, the IDS process can be terminated at operation 336. If the space vehicle 102 is operational the mode of the space vehicle 102 can be determined from the navigation control 120 at operation 340, the power available from the power supply 132 can be determined at operation 342, and the connection state can be determined from the transceiver 122, at operation 344. Note the operations 340, 342, 344 can be performed in parallel, in serial, and can be performed in any order.

At operation 346, the mode, power, and connection state from the operations 340, 342, 344 are used to determine the state of the space vehicle 102. The operation 346 can be performed by a switch statement that takes the mode, power, and connection state as input.

In launch and early orbit 220, the IDS monitor 134 can collect data that is different than when the space vehicle 102 is orbiting and in operation. The power and communications available allow the IDS monitor 134 to monitor all operations of the space vehicle 102 that can indicate whether or not there is an intrusion during launch at operation 350. Any launch events that are detected can be forwarded, in real-time, to the ground station 104.

In the operational and connected state 222 the IDS monitor 134 can perform different operations than it does in the launch and early orbit state 220. Since sufficient power is available and the space vehicle 102 has communications capability with the ground station 104 in this state, the monitor 134 can cause relevant, non-nominal data of the space vehicle 102 operation to be provided to the ground station 104. The data can be provided by first collecting space vehicle 102 event data at operation 356 and then forwarding, in real-time, any of the collected space vehicle 102 data to the ground station 104.

In the operational and autonomous state 224 the space vehicle 102 is operating as usual but does not currently have a communications channel to the ground station 104. Instead of relaying non-nominal data to the ground station 104 in real time, the space vehicle 102 can collect space vehicle 102 event data at operation 362 and store the data in on-satellite memory 334. Then, after communications with the ground station 104 are re-established, the space vehicle 102 can send the non-nominal data to the ground station 104.

In the safe mode 226 power from the power supply is lower than what is required to operate all functions of the space vehicle 102 for the mission. In the safe mode 226, the mission operations are prioritized over IDS operations. Instead of monitoring all of components that are monitored in modes in which there is sufficient power, in safe mode 226 only components that are being used in a given mission are monitored at operation 372. Any non-nominal data that is detected can be stored at operation 374. The stored data can then be sent to the ground station 104 when power and connectivity are sufficient for such operations.

In survival mode 228 the IDS monitor 134 can be turned off. In survival mode 228, the space vehicle 102 is trying to ensure that it stays in orbit and operational, at least in a minimal capacity to be useful. The survival mode 228 is intended to help the space vehicle 102 survive a malfunction, attack, or other adverse event that significantly harms the ability of the space vehicle 102 to operate to perform the mission. No monitoring is performed while in survival mode, as indicated by operation 368.

Figure 4:
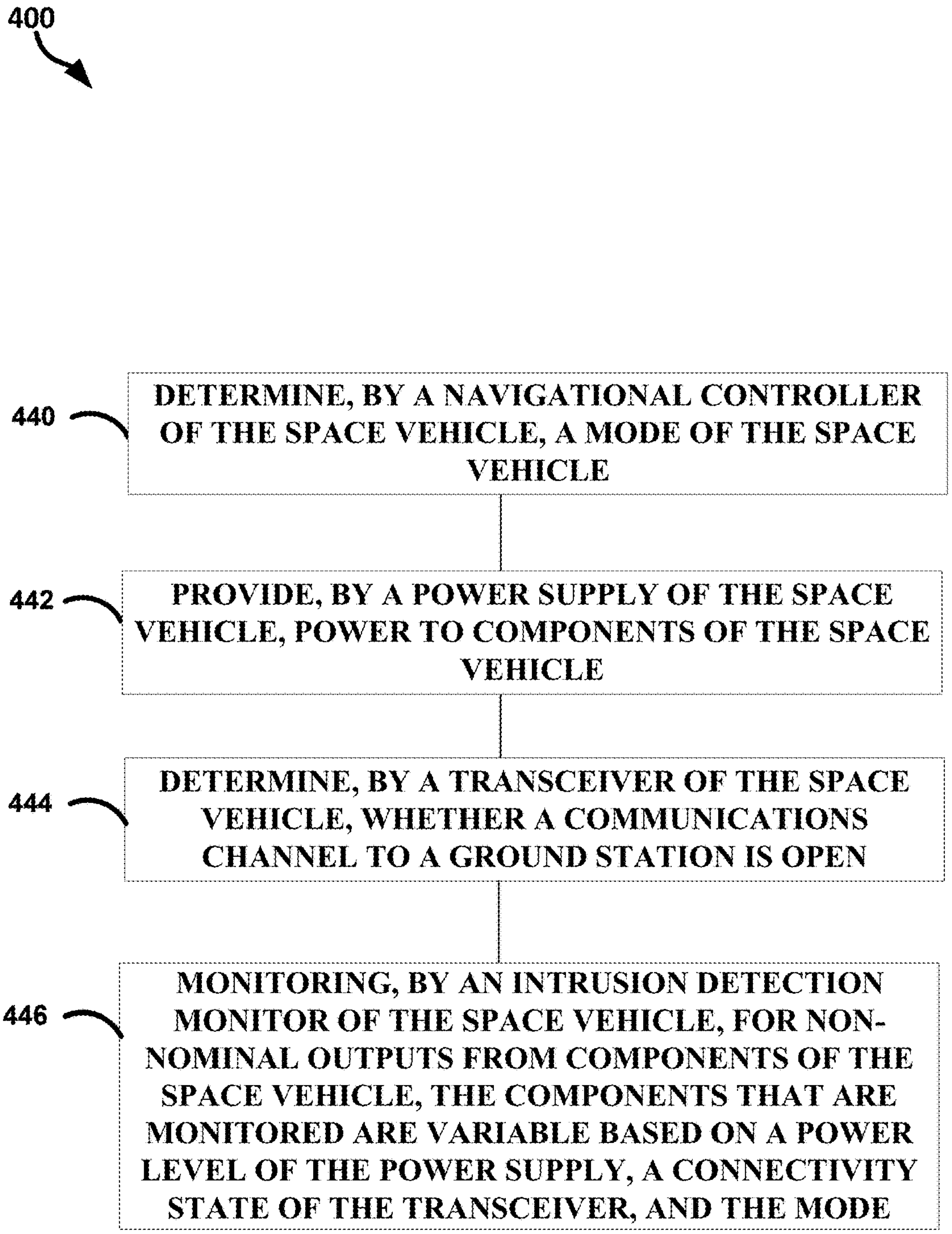
FIG. 4 illustrates, by way of example, a diagram of an embodiment of a method for improved satellite security.

FIG. 4 illustrates, by way of example, a diagram of an embodiment of a method 400 for improved space vehicle security. The method 400 as illustrated includes determining, by a navigational controller of the space vehicle, a mode of the space vehicle, at operation 440; providing, by a power supply of the space vehicle, power to components of the space vehicle, at operation 442; determining, by a transceiver of the space vehicle, whether a communications channel to a ground station is open, at operation 444; and monitoring, by an intrusion detection monitor of the space vehicle, for non-nominal outputs from components of the space vehicle, the components that are monitored are variable based on a power level of the power supply, a connectivity state of the transceiver, and the mode, at operation 446.

The mode can be one of a plurality of modes, and the modes include launch and early orbit, operational, survival, and safe modes. In launch and early orbit mode and operational mode, the intrusion detection monitor monitors all components of the components relevant to intrusion detection. In safe mode, the intrusion detection monitor monitors only components of the components used for a current mission. Safe mode can be indicated by the power level being below a specified threshold.

The method 400 can further include storing, in a memory of the space vehicle and by the intrusion detection monitor, when the space vehicle is in operational mode and not communicatively connected to a ground station, the non-nominal outputs in the memory. In survival mode, the intrusion detection monitor can refrain from monitoring any of the components of the space vehicle.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term “hardware-implemented module” should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a “cloud computing” environment or as a “software as a service” (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 5:
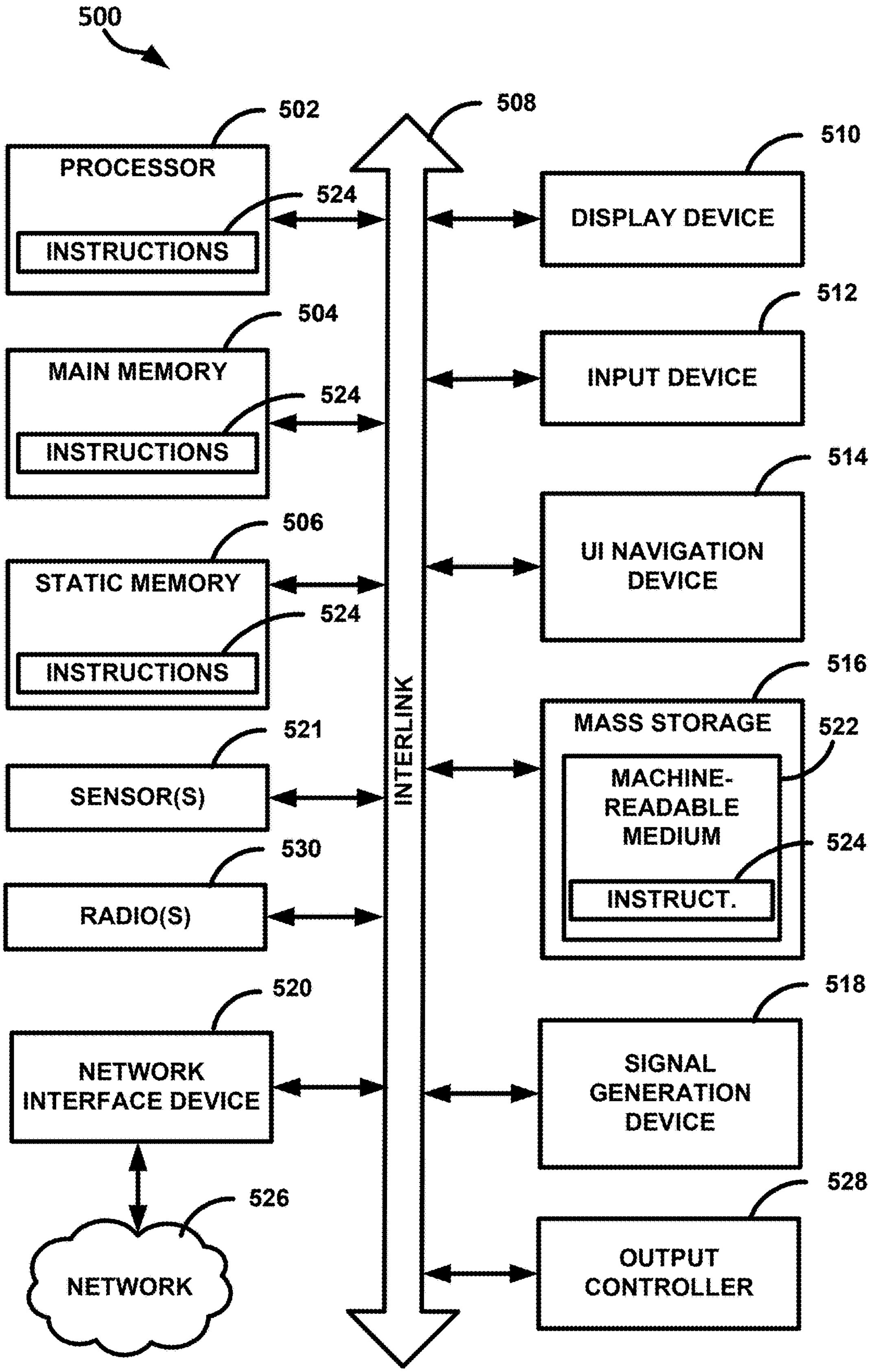
FIG. 5 illustrates, by way of example, a block diagram of an embodiment of a machine in the example form of a computer system 500 within which instructions, for causing the machine to perform any one or more of the methodologies discussed herein, may be executed.

FIG. 5 illustrates, by way of example, a block diagram of an embodiment of a machine in the example form of a computer system 500 within which instructions, for causing the machine to perform any one or more of the methodologies discussed herein, may be executed. One or more of the space vehicle 102, ground station 104, antenna 130, power supply 132, navigation control 120, transceiver 122, positioning system 124, inertial navigator 126, intrusion detection data monitor 134, cryptography circuit 128, processing circuitry 118, transceiver 112, antenna 114, operations 300, method 400, or a component or operation thereof can be implemented or performed by the computer system 500. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 521 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 504 and a static memory 506, which communicate with each other via a bus 508. The memory 504, 506 can store parameters (sometimes called weights) that define operations of the processing circuitry 118, monitor 134, or other component of the system 500. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), a network interface device 520, and radios 530 such as Bluetooth, WWAN, WLAN, and NFC, permitting the application of security controls on such protocols.

The machine 500 as illustrated includes an output controller 528. The output controller 528 manages data flow to/from the machine 500. The output controller 528 is sometimes called a device controller, with software that directly interacts with the output controller 528 being called a device driver.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504, the static memory 506, and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Example

Example 1 includes a space vehicle comprising a navigational controller configured to determine a mode of the space vehicle, a power supply configured to provide power to components of the space vehicle, a transceiver configured to determine whether a communications channel to a ground station is open, and an intrusion detection monitor configured to monitor for non-nominal outputs from components of the space vehicle, the components that are monitored are variable based on a power level of the power supply, a connectivity state of the transceiver, and the mode.

In Example 2, Example 1 further includes, wherein the modes include launch and early orbit, operational, survival, and safe modes.

In Example 3, Example 2 further includes, wherein, in launch and early orbit mode and operational mode, the intrusion detection monitor monitors all components of the components relevant to intrusion detection.

In Example 4, at least one of Examples 2-3 further includes, wherein, in safe mode, the intrusion detection monitor monitors only components of the components used for a current mission.

In Example 5, Example 4 further includes, wherein safe mode is indicated by the power level being below a specified threshold.

In Example 6, at least one of Examples 2-5 further includes a memory, wherein, the intrusion detection monitor, when in operational mode and not communicatively connected to a ground station stores the non-nominal outputs in the memory.

In Example 7, at least one of Examples 2-6 further includes, wherein, in survival mode, the intrusion detection monitor refrains from monitoring any of the components of the space vehicle.

Example 8 includes method for space vehicle intrusion detection, the method comprising determining, by a navigational controller of the space vehicle, a mode of the space vehicle, providing, by a power supply of the space vehicle, power to components of the space vehicle, determining, by a transceiver of the space vehicle, whether a communications channel to a ground station is open, and monitoring, by an intrusion detection monitor of the space vehicle, for non-nominal outputs from components of the space vehicle, the components that are monitored are variable based on a power level of the power supply, a connectivity state of the transceiver, and the mode.

In Example 9, Example 8 further includes, wherein the mode is one of a plurality of modes, and the modes include launch and early orbit, operational, survival, and safe modes.

In Example 10, Example 9 further includes, wherein, in launch and early orbit mode and operational mode, the intrusion detection monitor monitors all components of the components relevant to intrusion detection.

In Example 11, at least one of Examples 9-10 further includes, wherein, in safe mode, the intrusion detection monitor monitors only components of the components used for a current mission.

In Example 12, Example 11 further includes, wherein, safe mode is indicated by the power level being below a specified threshold.

In Example 13, at least one of Examples 9-12 further includes storing, in a memory of the space vehicle and by the intrusion detection monitor, when the space vehicle is in operational mode and not communicatively connected to a ground station, the non-nominal outputs in the memory.

In Example 14, at least one of Examples 9-13 further includes, wherein, in survival mode, the intrusion detection monitor refrains from monitoring any of the components of the space vehicle.

Example 15 includes a non-transitory machine-readable medium including instructions that, when executed by a machine, cause the machine to perform operations for intrusion detection in a space vehicle, the operations comprising determining, by a navigational controller of the space vehicle, a mode of the space vehicle, providing, by a power supply of the space vehicle, power to components of the space vehicle, determining, by a transceiver of the space vehicle, whether a communications channel to a ground station is open, and monitoring, by an intrusion detection monitor of the space vehicle, for non-nominal outputs from components of the space vehicle, the components that are monitored are variable based on a power level of the power supply, a connectivity state of the transceiver, and the mode.

In Example 16, Example 15 further includes, wherein the mode is one of a plurality of modes, and the modes include launch and early orbit, operational, survival, and safe modes.

In Example 17, Example 16 further includes, wherein, in launch and early orbit mode and operational mode, the intrusion detection monitor monitors all components of the components relevant to intrusion detection.

In Example 18, at least one of Examples 16-17 further includes, wherein, in safe mode, the intrusion detection monitor monitors only components of the components used for a current mission.

In Example 19, Example 18 further includes, wherein safe mode is indicated by the power level being below a specified threshold.

In Example 20, at least one of Examples 16-19 further includes wherein the operations further comprise storing, in a memory of the space vehicle and by the intrusion detection monitor, when the space vehicle is in operational mode and not communicatively connected to a ground station, the non-nominal outputs in the memory.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A space vehicle comprising:

a navigational controller configured to determine a mode of the space vehicle;

a power supply configured to provide power to components of the space vehicle;

a transceiver configured to determine whether a communications channel to a ground station is open; and an intrusion detection monitor configured to monitor for non-nominal outputs from components of the space vehicle, the components that are monitored are variable based on a power level of the power supply, a connectivity state of the transceiver, and the mode.

2. The space vehicle of claim 1, wherein the modes include launch and early orbit, operational, survival, and safe modes.

3. The space vehicle of claim 2, wherein, in launch and early orbit mode and operational mode, the intrusion detection monitor monitors all components of the components relevant to intrusion detection.

4. The space vehicle of claim 2, wherein, in safe mode, the intrusion detection monitor monitors only components of the components used for a current mission.

5. The space vehicle of claim 4, wherein safe mode is indicated by the power level being below a specified threshold.

6. The space vehicle of claim 2, further comprising a memory, wherein, the intrusion detection monitor, when in operational mode and not communicatively connected to a ground station stores the non-nominal outputs in the memory.

7. The space vehicle of claim 2, wherein, in survival mode, the intrusion detection monitor refrains from monitoring any of the components of the space vehicle.

8. A method for space vehicle intrusion detection, the method comprising:
determining, by a navigational controller of the space vehicle, a mode of the space vehicle;
providing, by a power supply of the space vehicle, power to components of the space vehicle;
determining, by a transceiver of the space vehicle, whether a communications channel to a ground station is open; and
monitoring, by an intrusion detection monitor of the space vehicle, for non-nominal outputs from components of the space vehicle, the components that are monitored are variable based on a power level of the power supply, a connectivity state of the transceiver, and the mode.

9. The method of claim 8, wherein the mode is one of a plurality of modes, and the modes include launch and early orbit, operational, survival, and safe modes.

10. The method of claim 9, wherein, in launch and early orbit mode and operational mode, the intrusion detection monitor monitors all components of the components relevant to intrusion detection.

11. The method of claim 9, wherein, in safe mode, the intrusion detection monitor monitors only components of the components used for a current mission.

12. The method of claim 11, wherein, safe mode is indicated by the power level being below a specified threshold.

13. The method of claim 9, further comprising storing, in a memory of the space vehicle and by the intrusion detection monitor, when the space vehicle is in operational mode and not communicatively connected to a ground station, the non-nominal outputs in the memory.

14. The method of claim 9, wherein, in survival mode, the intrusion detection monitor refrains from monitoring any of the components of the space vehicle.

15. A non-transitory machine-readable medium including instructions that, when executed by a machine, cause the machine to perform operations for intrusion detection in a space vehicle, the operations comprising:
determining, by a navigational controller of the space vehicle, a mode of the space vehicle;
providing, by a power supply of the space vehicle, power to components of the space vehicle;
determining, by a transceiver of the space vehicle, whether a communications channel to a ground station is open; and
monitoring, by an intrusion detection monitor of the space vehicle, for non-nominal outputs from components of the space vehicle, the components that are monitored are variable based on a power level of the power supply, a connectivity state of the transceiver, and the mode.

16. The non-transitory machine-readable medium of claim 15, wherein the mode is one of a plurality of modes, and the modes include launch and early orbit, operational, survival, and safe modes.

17. The non-transitory machine-readable medium of claim 16, wherein, in launch and early orbit mode and operational mode, the intrusion detection monitor monitors all components of the components relevant to intrusion detection.

18. The non-transitory machine-readable medium of claim 16, wherein, in safe mode, the intrusion detection monitor monitors only components of the components used for a current mission.

19. The non-transitory machine-readable medium of claim 18, wherein, safe mode is indicated by the power level being below a specified threshold.

20. The non-transitory machine-readable medium of claim 16, wherein the operations further comprise storing, in a memory of the space vehicle and by the intrusion detection monitor, when the space vehicle is in operational mode and not communicatively connected to a ground station, the non-nominal outputs in the memory.

* * * * *